US011082200B2

(12) United States Patent
Chang et al.

(10) Patent No.: US 11,082,200 B2
(45) Date of Patent: Aug. 3, 2021

(54) CLOCK DATA RECOVERY APPARATUS AND METHOD

(71) Applicant: Realtek Semiconductor Corporation, Hsinchu (TW)

(72) Inventors: Chieh-Shiung Chang, Hsinchu (TW); Chia-Jung Chang, Hsinchu (TW); Yu-An Chang, Hsinchu (TW); Cheng-Yu Liu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/001,768

(22) Filed: Aug. 25, 2020

(65) Prior Publication Data

US 2021/0067314 A1 Mar. 4, 2021

(30) Foreign Application Priority Data

Aug. 30, 2019 (TW) .................................. 108131421

(51) Int. Cl.
*H04L 7/033* (2006.01)
(52) U.S. Cl.
CPC .................................... *H04L 7/033* (2013.01)
(58) Field of Classification Search
CPC ....................................................... H04L 7/033
USPC .......................................... 375/375, 376, 377
See application file for complete search history.

(56) References Cited

U.S. PATENT DOCUMENTS

| 5,400,370 | A | * | 3/1995 | Guo | ....................... | H03L 7/0814 |
| | | | | | | 375/371 |
| 5,717,728 | A | * | 2/1998 | Hein | ...................... | H04L 7/0331 |
| | | | | | | 375/355 |
| 6,693,985 | B2 | * | 2/2004 | Li | ........................... | H03L 7/091 |
| | | | | | | 375/355 |
| 7,394,884 | B2 | * | 7/2008 | Kaylani | .................. | G06F 1/025 |
| | | | | | | 375/372 |
| 7,684,534 | B2 | * | 3/2010 | Buchmann | ............ | H04L 7/0083 |
| | | | | | | 375/376 |
| 10,057,099 | B1 | * | 8/2018 | Eckermann | ............. | H04L 25/49 |
| 2005/0238126 | A1 | | 10/2005 | Ribo et al. | | |

* cited by examiner

*Primary Examiner* — Qutbuddin Ghulamali
(74) *Attorney, Agent, or Firm* — Locke Lord LLP; Tim Tingkang Xia, Esq.

(57) ABSTRACT

A clock and data recovery apparatus is provided that includes a sampling circuit, a storage circuit and a determining circuit. The sampling circuit includes sampling units each sampling a received data according to one of reference clock signals to generate a sampling result. The storage circuit includes FIFO storage units configured to store the sampling result of the received data corresponding to different time spots. The determining circuit is configured to set a certain number of received data as a reference data pattern, to adjust a starting position of a sampling window according to a transition point of sampled values within the reference data pattern when only one data transition exists therein and adjust a length of the sampling window according to an amount of high state sample points of the sampled values within the reference data pattern when more than one data transitions exist therein.

12 Claims, 3 Drawing Sheets

|     | SV₁ | SV₂ | SV₃ | SV₄ | SV₅ | SV₆ | SV₇ | SV₈ | SV₉ | SV₁₀ | SV₁₁ | SV₁₂ | SV₁₃ | SV₁₄ | SV₁₅ | SV₁₆ |
|-----|---|---|---|---|---|---|---|---|---|---|---|---|---|---|---|---|
| FF₁ | 0 | 1 | 1 | 1 | 1 | 1 | 1 | 1 | 1 | 1 | 1 | 1 | 1 | 1 | 1 | 1 |
| FF₂ | 1 | 0 | 0 | 0 | 0 | 0 | 0 | 0 | 0 | 0 | 0 | 0 | 0 | 0 | 0 | 0 |
| FF₃ | 0 | 0 | 0 | 0 | 0 | 0 | 0 | 0 | 0 | 0 | 0 | 0 | 0 | 0 | 0 | 0 |
| FF₄ | 0 | 0 | 0 | 0 | 0 | 0 | 0 | 0 | 0 | 0 | 0 | 0 | 0 | 0 | 0 | 0 |

CLOCK DATA RECOVERY APPARATUS AND METHOD

RELATED APPLICATION

This application claims priority to Taiwan Application Serial Number 108131421, filed Aug. 30, 2019, which is herein incorporated by reference in its entirety.

BACKGROUND

Technical Field

The present invention relates to clock data recovery techniques, and particularly relates to a clock data recovery apparatus and method.

Description of Related Art

Digital data in high speed transmission are often accompanied with noise or distortion, and therefore a clock data recovery circuit is usually required in transceivers for regenerating low jitter clocks and recovering data having low noise. In common clock data recovery techniques, phase shifting is used for selecting an optimal sampling phase. However, a more complex circuit design and a larger area are needed in the design of such a circuit.

Therefore, those in the art continue to work toward designing a new clock data recovery apparatus and method to address the above-described defects.

SUMMARY

A simplified summary of the present disclosure is presented, so as to provide the reader with a basic understanding of the present disclosure. This summary is not a complete description of the present disclosure, and the purpose thereof is neither for pointing out the important or key components of the embodiments of the present disclosure nor defining the scope of the present disclosure.

The present disclosure of an embodiment provides a clock data recovery apparatus and method to improve the issues with conventional techniques.

A technical aspect of the present disclosure is related to a clock data recovery apparatus comprising a sampling circuit, a storage circuit, and a determining circuit. The sampling circuit comprises n sampling units, each of the sampling units being configured to separately sample a plurality of received data in a data signal based on one of n reference clock signals so as to generate a sampling result comprising n sampled values, wherein n positive edges of then reference clock signals equally divide a period of the data signal. The storage circuit comprises m first in first out (FIFO) storage units configured to store, for m different time points, a number m of the sampling result for the received data in order. The determining circuit is configured to: set a number P of the received data as a reference data pattern, the number P of the received data stored by P consecutive FIFO storage units being selected among the FIFO storage units; when there is only one data transition in the reference data pattern, adjust a starting position of a sampling window based on a transition point of the sampled values in the reference data pattern; and when there are multiple data transitions in the reference data pattern, adjust a length of the sampling window based on a number of high state samples of the sampled values among the reference data pattern, the high state samples corresponding to a high state; wherein the sampling window determines a beginning and an end of any of the received data.

A further technical aspect of the present disclosure is related to a clock data recovery method applied in a clock data recovery apparatus, comprising: causing n sampling units, comprised of a sampling circuit, to separately sample a plurality of received data in a data signal based on one of n reference clock signals so as to generate a sampling result comprising n sampled values, wherein n positive edges of the n reference clock signals equally divide a period of the data signal; causing m FIFO storage units, comprised of a storage circuit, to store a number m of the sampling result for the received data in order for m different time points; causing a determining circuit to set a number P of the received data, stored by P consecutive FIFO storage units selected among the FIFO storage units, as a reference data pattern; when there is only one data transition in the reference data pattern, causing the determining circuit to adjust a starting position of a sampling window based on a transition point of the sampled values in the reference data pattern; and when there are multiple data transitions in the reference data pattern, causing the determining circuit to adjust a length of the sampling window based on a number of high state samples of the sampled values among the reference data pattern, the high state samples corresponding to a high state, wherein the sampling window determines a beginning and an end of any of the received data.

The clock data recovery apparatus and method of the present disclosure may dynamically adjust the starting position and length of the sampling window based on a format of the reference data pattern, and adaptively track the phase and waveform of the data signal, to reserve a better sampling resolution and performance on bit error rate.

BRIEF DESCRIPTION OF THE DRAWINGS

To make the aforementioned and other objectives, features, advantages, and embodiments of the present disclosure more readily understood, a description of the accompanying drawings is provided as follows:

FIG. 2 is a detailed block diagram of a storage circuit in one embodiment of the present disclosure.

DETAILED DESCRIPTION

Figure 1:
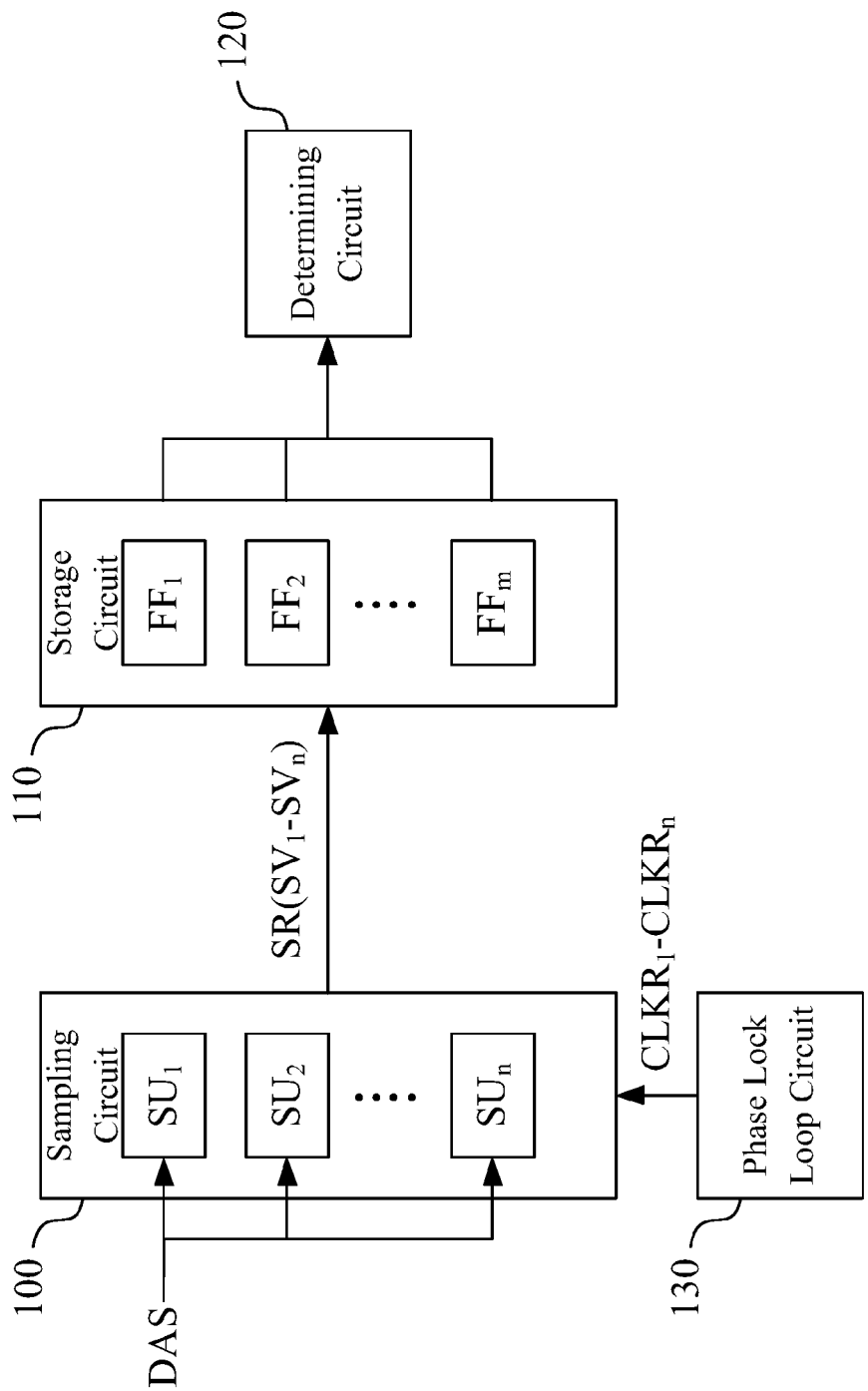
FIG. 1 is a block diagram of a clock data recovery apparatus in one embodiment of the present disclosure.

Reference is made to FIG. 1. FIG. 1 is a block diagram of a clock data recovery apparatus 1 in one embodiment of the present disclosure. The clock data recovery apparatus 1 is configured to receive a data signal DAS and to recover its corresponding clock signal by sampling the data signal DAS. For example, the clock data recovery apparatus 1 is a serializer and/or a deserializer applicable for data transmission in Smart Card Transport, but the present disclosure is not limited in this regard.

The clock data recovery apparatus 1 comprises a sampling circuit 100, a storage circuit 110, and a determining circuit 120.

The sampling circuit 100 comprises n sampling units $SU_1$-$SU_n$, each configured to separately sample a plurality of received data in the data signal DAS based on one of n reference clock signals $CLKR_1$-$CLKR_n$ so as to generate a sampling result SR comprising n sampled values $SV_1$-$SV_n$, where n is an integer equal to or greater than 1.

In one embodiment, the clock data recovery apparatus 1 further comprises a phase lock loop (PLL) circuit 130 configured to generate n reference clock signals $CLKR_1$-$CLKR_n$, in which n positive edges of the reference clock signals $CLKR_1$-$CLKR_n$ equally divide a period of the data signal DAS. For instance, when the period of the data signal DAS is T and n is 16, any two closest positive edges in the reference clock signals $CLKR_1$-$CLKR_n$ would be spaced by T/16.

In one embodiment, since one received data in the data signal DAS occupies a transmission time of a period, ideally the n positive edges of the n reference clock signals $CLKR_1$-$CLKR_n$ sample the same received data for n different time points to generate the sampling result SR comprising n sampled values $SV_1$-$SV_n$.

The storage circuit 110 may comprise a number m of first-in-first-out (FIFO) storage units $FF_1$-$FF_m$ configured to store, for m different time points, a number in of the sampling results SR for the received data in order. The number m is an integer greater than or equal to 1. As a result, each of the FIFO storage units $FF_1$-$FF_m$ has a depth of n, in order to store the sampling results SR having n sampled values $SV_1$-$SV_n$ corresponding to each received data.

For example, the FIFO storage unit $FF_1$ may store, at the first time point, the sampling result SR having n sampled values $SV_1$-$SV_n$ for the first received data. The FIFO storage unit $FF_2$ may store, at the second time point, the sampling result SR having n sampled values $SV_1$-$SV_n$, for the second received data. The FIFO storage unit $FF_m$ may store the sampling result SR having n sampled values $SV_1$-$SV_n$ for the m-th received data at the m-th time point, and so on.

It is to be noted that the FIFO storage units $FF_1$-$FF_m$ perform the storing according to the order of time as a cycle. Therefore in the (m+1)-th time point, the FIFO storage unit $FF_1$ may receive the sampling result SR for the (m+1)-th received data to replace the originally stored sampling result SR for the first received data. The FIFO storage unit $FF_2$ may therefore replace the originally stored sampling result SR for the second received data with the sampling result SR for the (m+2)-th received data at the (m+2)-th time point. The FIFO storage unit $FF_m$ may store the sampling result SR for the 2m-th received data at the 2m-th time point to replace the originally stored sampling result SR for the m-th received data, and so on.

In one embodiment, the determining circuit 120 may operate in a training mode and an operation mode. In the training mode, the sampling circuit 100 receives the data signal DAS transmitted in a training pattern, and the determining circuit 120 sets the sampling window and the reference data pattern based on the data signal DAS in the training pattern after being stored by the storage circuit 110.

On the other hand, in the operation mode, the sampling circuit 100 receives the actual data signal DAS, and the sampling window is adjusted by the reference data pattern after the data signal is stored by the storage circuit 110. The sampling window determines the beginning and end of any one of the received data. The determining circuit 120 determines, based on the sampling window, the output value for a received data to be output.

A more detailed description for the operation mechanism of the determining circuit 120 is provided below.

Reference is made to FIG. 2. FIG. 2 is a detailed block diagram of the storage circuit 110 in one embodiment of the present disclosure.

In the present embodiment, the number n of the reference clock signals $CLKR_1$-$CLKR_n$ described above is 16, and the number m of the FIFO storage units $FF_1$-$FF_m$ is 4. Therefore, each of the FIFO storage unit $FF_1$-$FF_4$ comprises a depth of 16 in order to store 16 sampled values $SV_1$-$SV_{16}$ corresponding to different received data.

In the training mode, the sampling circuit 100 may first receive a training pattern comprising a plurality of received data, in order to perform basic settings for the sampling window based on the training pattern. Here, only one predetermined received data among the plurality of received data comprised in the training pattern is in a high state (for example, the logical high denoted by "1").

For example, the plurality of received data comprised of the training pattern may be (10000000). That is, the first received data is the predetermined received data in a high state, and the rest of the seven received data are all in a low state (for example, the logical low denoted by "0").

Under such circumstances, the FIFO storage units $FF_1$-$FF_4$ will accordingly store the first four received data of the training pattern, as shown in FIG. 2. However, since the phase of the data signal DAS is not consistent with the phase of the reference clock signal $CLKR_1$-$CLKR_n$, the 16 sampled values corresponding to the first received data stored by the FIFO storage unit $FF_1$ are (0111,1111,1111,1111), and the 16 sampled values corresponding to the second received data stored by the FIFO storage unit $FF_2$ are (1000,0000,0000,0000). Furthermore, the 16 sampled values $SV_1$-$SV_{16}$ corresponding to both the third and fourth received data stored by the FIFO storage units $FF_3$ and $FF_4$ are all 0.

Under such circumstances, the determining circuit 120 may set the beginning of the high state in the predetermined received data as the predetermined starting position of the sampling window, and set n as the predetermined length of the sampling window.

In greater detail, in the embodiment described above, the determining circuit 120 sets the position of the sampled value $SV_2$ correspondingly stored by the FIFO storage unit $FF_1$ as the predetermined starting position of the sampling window, and sets the length of the sampling window to 16. The sampling window set in such a manner is illustrated in black, bold border lines in FIG. 2.

Further, the determining circuit 120 sets a number P of received data, which are stored by P consecutive FIFO storage units centered at the FIFO storage unit $FF_1$, as the reference data pattern, in which P is an integer greater than or equal to 1.

In one embodiment, P may be set as 3. Therefore, the determining circuit 120, starting with the FIFO storage unit $FF_1$ as the center, sets the 3 received data collectively stored by the preceding FIFO storage unit $FF_4$ (the FIFO storage unit after $FF_1$ is $FF_4$ since the FIFO storage units $FF_1$-$FF_4$ are used for storage in a cycle) and the following FIFO storage unit $FF_2$ (the FIFO storage unit after $FF_1$) as the reference data pattern.

It should be noted that in other embodiments, the sampling circuit 100 may receive a plurality of training patterns for more accurately pre-setting the sampling window. Moreover, the position of the predetermined received data in a high state comprised in the training pattern received by the sampling circuit 100 may be different as needed. For instance, the training pattern may be, for example, (00010000) or (00000010), but is not limited in this regard.

In the operation mode, the determining circuit 120 receives the real data signal DAS in a non-training pattern, and adjusts the sampling window according to the contents of the reference data pattern. In the embodiment described above, the reference data pattern set by the determining circuit 120 is the received data stored by the FIFO storage units $FF_4$, $FF_1$, and $FF_2$ in order.

When there is only one data transition in the reference data pattern, the determining circuit 120 adjusts the starting position of the sampling window based on the transition point of the sampled values in the reference data pattern. For example, when the reference data pattern is (001), (011), (100), or (110), the determining circuit 120 will determine the position of the transition point in the sampled values, and accordingly adjust the starting position of the sampling window.

In more detail, in an example in which the reference data pattern is (011) and the sampled values $SV_1$-$SV_{16}$ stored in the FIFO storage units $FF_4$ and $FF_1$ are (0000,0000,0000, 0011) and (1111,1111,1111,1111), respectively, the determining circuit 120 will determine that the position of the transition point in which the transition from 0 to 1 occurs is the position corresponding to the sampled value $SV_{15}$ stored by the FIFO storage unit $FF_4$. This position is before the original starting position of the sampling window, and therefore the determining circuit 120 may move forward the starting position of the sampling window.

In another embodiment, if the position of the transition point is after the original starting position of the sampling window, the determining circuit 120 may move backward the starting position of the sampling window.

Since there may be phase shifting in the data signal DAS under transmission, the determining circuit 120 may adjust the starting position of the sampling window via the approach described above to track the clock phase matching the current data signal DAS.

On the other hand, when there are multiple data transitions in the reference data pattern, the determining circuit 120 will adjust the length of the sampling window based on a number of high state samples of the sampled values among the reference data pattern. For example, when the reference data pattern is (010) or (101), the determining circuit 120 will determine the number of high state samples in the sampled values and adjust the length of the sampling window accordingly.

In more detail, in an example in which the reference data pattern is (010) and the sampled values stored in the FIFO storage units $FF_4$, $FF_1$, and $FF_2$ are (0000,0000,0000,0011), (1111,1111,1111,0000), and (0000,0000,0000,0000), respectively, the determining circuit 120 will determine that the number of high state samples is 14, which is less than the predetermined length of the sampling window 16. Therefore the determining circuit 120 may reduce the length of the sampling window.

Multiple data transitions may indicate that the data signal DAS is in a non-stable state, possibly causing the waveform associated with the received data in a high state to transform from a nearly square wave shape to a shape of a shark fin and to distort, and the length of the waveform in a high state is compressed. Therefore, the determining circuit 120 may shorten the sampling window via the approach described above in order to ensure the accuracy of data samples.

After adjusting the sampling window, the determining circuit 120 determines the output value for a received data based on this sampling window and outputs the same.

While receiving the data signal DAS, the transmission channel may cause phase shifting or transformation of the data waveform, rendering the clock of the data signal DAS incapable of being correctly recovered and meaningful data incapable of being sampled.

The clock data recovery apparatus 1 of the present disclosure may, based on the format of the reference data pattern, dynamically adjust the starting position and length of the sampling window, and adaptively track the phase and waveform of the data signal DAS. Through such an operation, the resulting resolution of the data signal DAS is enhanced and the bit error rate is lowered.

Furthermore, since the clock data recovery apparatus 1 of the present disclosure does not require circuits associated with phase shifting of data, circuit design may be simplified and the area needed for the circuit may be significantly reduced.

Figure 3:
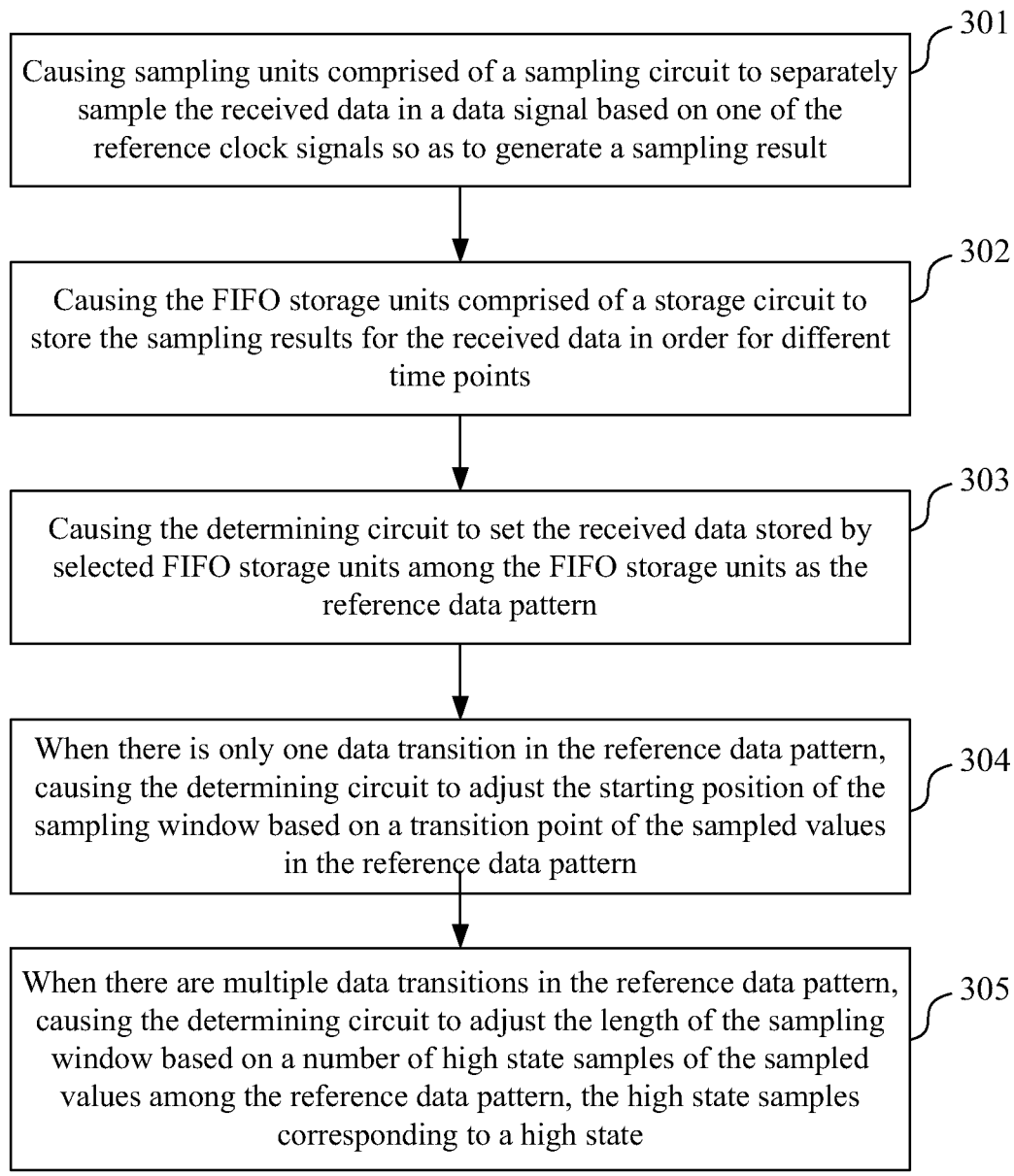
FIG. 3 is a flow diagram of a clock data recovery method in one embodiment of the present disclosure.

FIG. 3 is a flow diagram for a clock data recovery method 300 in one embodiment of the present disclosure.

The clock data recovery method 300 may be applied in what is shown in FIG. 1. The clock data recovery method 300 comprises the steps described below. It is to be noted that the order of the steps in the present embodiment may be altered as required, unless the order is specifically stated, and some or all of the steps may even be performed simultaneously.

At Step 301, the n sampling units $SU_1$-$SU_n$ included in the sampling circuit 100 are caused to separately sample a plurality of received data in the data signal DAS based on one of the n reference clock signals $CLKR_1$-$CLKR_n$ so as to generate the sampling result SR comprising n sampled values $SV_1$-$SV_n$, in which the n positive edges of the n reference clock signals $CLKR_1$-$CLKR_n$ equally divide a period of the data signal.

At Step 302, the m FIFO storage units $FF_1$-$FF_m$ included in the storage circuit 110 are caused to store a number m of the sampling results SR for m received data in order for m different time points.

At Step 303, the determining circuit 120 is caused to set a number P of the received data as the reference data pattern, the number P of the received data stored by P consecutive FIFO storage units being selected among the FIFO storage units $FF_1$-$FF_m$.

At Step 304, when there is only one data transition in the reference data pattern, the determining circuit 120 is caused to adjust the starting position of the sampling window based on a transition point of the sampled values in the reference data pattern.

At Step 305, when there are multiple data transitions in the reference data pattern, the determining circuit 120 is caused to adjust the length of the sampling window based on a number of high state samples of the sampled values among the reference data pattern, the high state samples corresponding to a high state, in which the sampling window determines the beginning and end of any of the received data.

Although specific embodiments of the present disclosure have been described above, the present disclosure is not limited to these embodiments. Those skilled in the art can make various alterations and modifications to the embodiments without departing from the principle and spirit of the present disclosure. Therefore, it is intended that the scope of protection of the present disclosure is defined by the following claims.

What is claimed is:

1. A clock data recovery apparatus, comprising:
   a sampling circuit comprising n sampling units, each of the n sampling units being configured to separately sample a plurality of received data in a data signal based on one of n reference clock signals so as to generate a sampling result comprising n sampled values;

a storage circuit comprising m first-in-first-out (FIFO) storage units configured to store, for m different time points, a number m of the sampling result for the plurality of received data in order; and a determining circuit configured to:
set a number P of the plurality of received data as a reference data pattern, the number P of the plurality of received data stored by P consecutive FIFO storage units being selected among the FIFO storage units;
when there is only one data transition in the reference data pattern, adjust a starting position of a sampling window based on a transition point of the n sampled values in the reference data pattern; and
when there are multiple data transitions in the reference data pattern, adjust a length of the sampling window based on a number of high state samples of the n sampled values among the reference data pattern, the high state samples corresponding to a high state;
wherein the sampling window determines a beginning and an end of any of the plurality of received data.

2. The clock data recovery apparatus of claim 1, wherein when the plurality of received data is a training pattern in which there is only one predetermined received data in the high state, the determining circuit is further configured to set the number P of the plurality of received data stored by the P consecutive FIFO storage units as the reference data pattern, the P consecutive FIFO storage units being centered at one of the FIFO storage units which stored the predetermined received data.

3. The clock data recovery apparatus of claim 2, wherein the determining circuit is further configured to set a starting point of high state of the predetermined received data as a predetermined starting position of the sampling window, and set n as a predetermined length of the sampling window.

4. The clock data recovery apparatus of claim 1, wherein n of the reference clock signals are generated by a phase lock loop (PLL) circuit.

5. The clock data recovery apparatus of claim 1, wherein the determining circuit adjusts the starting position of the sampling window forward when there is only one data transition in the reference data pattern and the transition point is ahead of the starting position of the sampling data, and adjusts the starting position of the sampling window backward when the transition point is after the starting position of the sampling data;
the determining circuit further reduces the length of the sampling window when there are multiple data transitions in the reference data pattern and the number of high state samples is less than the length of the sampling window.

6. The clock data recovery apparatus of claim 1, wherein n positive edges of the n reference clock signals equally divide a period of the data signal.

7. A clock data recovery method, applied in a clock data recovery apparatus, the method comprising:
causing n sampling units, comprised of a sampling circuit, to separately sample a plurality of received data in a data signal based on one of n reference clock signals so as to generate a sampling result comprising n sampled values;

causing m first-in-first-out (FIFO) storage units, comprised of a storage circuit, to store a number m of the sampling result for the plurality of received data in order for m different time points;
causing a determining circuit to set a number P of the plurality of received data, stored by P consecutive FIFO storage units selected among the FIFO storage units, as a reference data pattern;
when there is only one data transition in the reference data pattern, causing the determining circuit to adjust a starting position of a sampling window based on a transition point of the n sampled values in the reference data pattern; and
when there are multiple data transitions in the reference data pattern, causing the determining circuit to adjust a length of the sampling window based on a number of high state samples of the n sampled values among the reference data pattern, the high state samples corresponding to a high state, wherein the sampling window determines a beginning and an end of any of the plurality of received data.

8. The clock data recovery method of claim 7, wherein when the plurality of received data is a training pattern in which there is only one predetermined received data in the high state, the clock data recovery method further comprises:
causing the determining circuit to set the number P of the received data stored by the P consecutive FIFO storage units as the reference data pattern, the P consecutive FIFO storage units being centered at one of the FIFO storage units which stored the predetermined received data.

9. The clock data recovery method of claim 8, wherein the clock data recovery method further comprises:
causing the determining circuit to set a starting point of high state of the predetermined received data as a predetermined starting position of the sampling window, and set n as a predetermined length of the sampling window.

10. The clock data recovery method of claim 8, wherein n positive edges of the n reference clock signals equally divide a period of the data signal.

11. The clock data recovery method of claim 7, wherein the clock data recovery method further comprises:
causing a phase lock loop (PLL) circuit to generate n of the reference clock signals.

12. The clock data recovery method of claim 7, further comprising:
causing the determining circuit to adjust the starting position of the sampling window forward when there is only one data transition in the reference data pattern and the transition point is ahead of the starting position of the sampling data, and adjust the starting position of the sampling window backward when the transition point is after the starting position of the sampling data; and
causing the determining circuit further to reduce the length of the sampling window when there are multiple data transitions in the reference data pattern and the number of high state samples is less than the length of the sampling window.

* * * * *